Feb. 6, 1968   J. A. MORREAL ET AL   3,367,175
ABLATION SENSOR
Filed Dec. 31, 1958   3 Sheets-Sheet 2
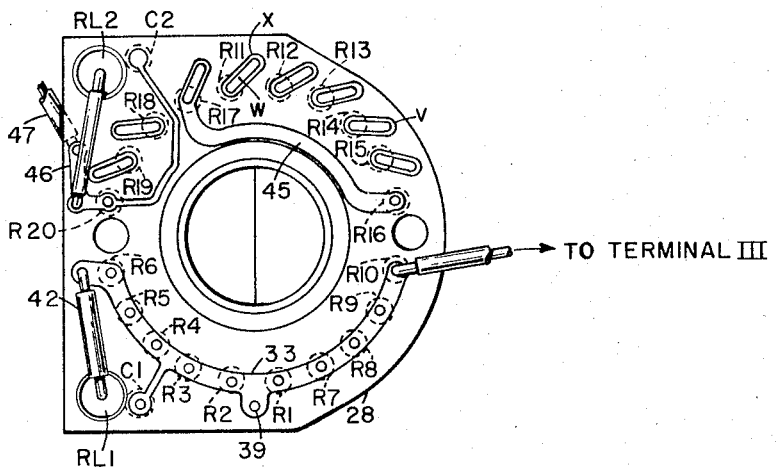
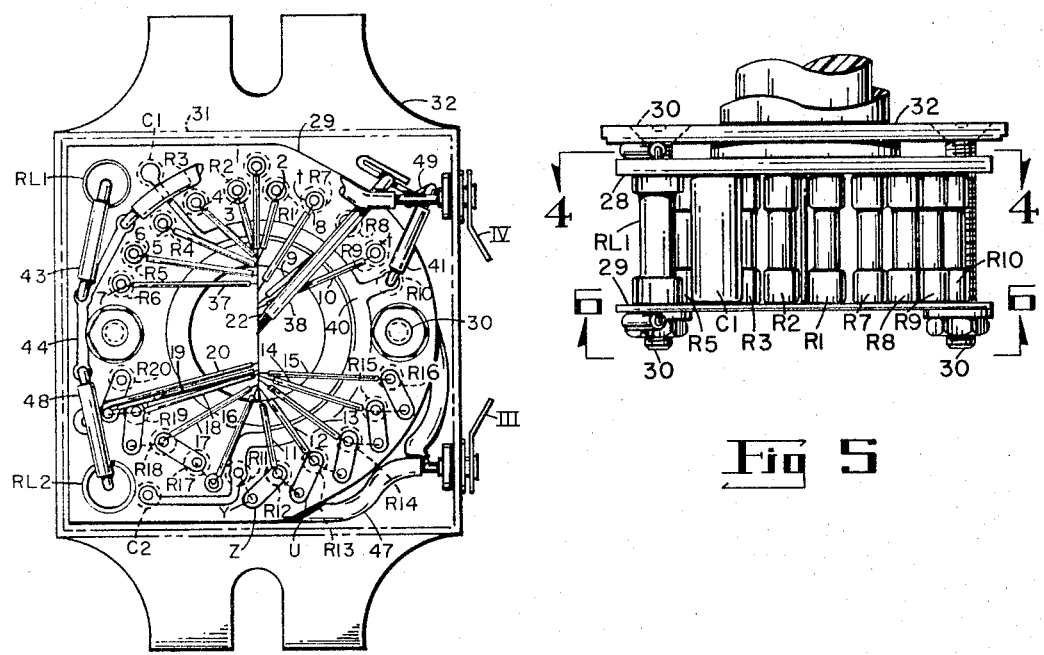
JOHN A. MORREAL
JOSEPH A. HULL
*INVENTORS*
BY
ATTORNEYS Feb. 6, 1968

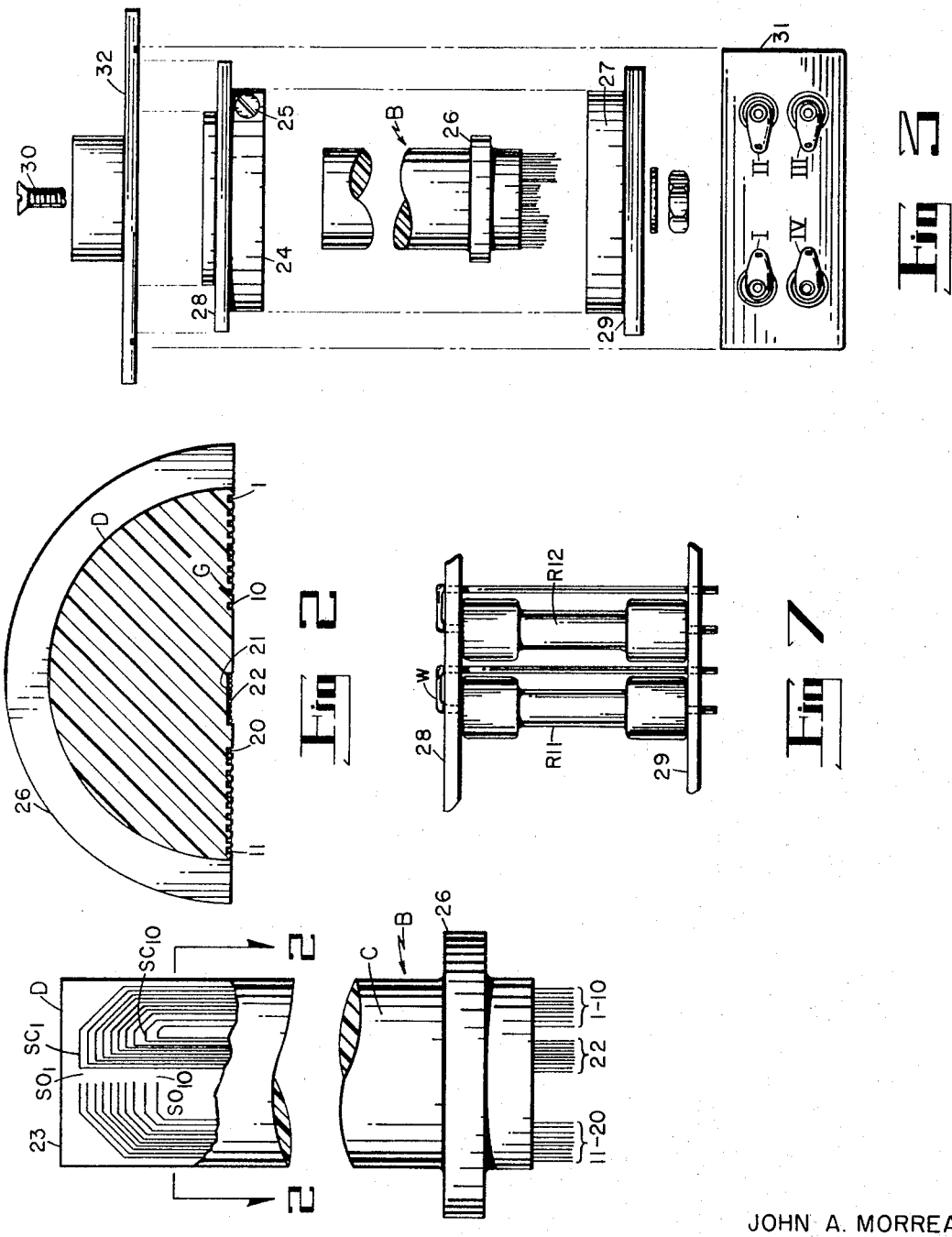

J. A. MORREAL ET AL 3,367,175

ABLATION SENSOR

Filed Dec. 31, 1958

JOHN A. MORREAL
JOSEPH A. HULL
INVENTORS

BY
ATTORNEYS

United States Patent Office 3,367,175
Patented Feb. 6, 1968

3,367,175
ABLATION SENSOR
John A. Morreal, North Andover, and Joseph A. Hull, Danvers, Mass., assignors to Avco Manufacturing Corporation, Cincinnati, Ohio, a corporation of Delaware
Filed Dec. 31, 1958, Ser. No. 784,342
7 Claims. (Cl. 73—86)

The present invention relates to the field of instrumentation and more particularly to an instrument for measuring ablation of materials.

The invention finds particular application in the field of missiles where materials are frequently subjected to severe environmental conditions. To cope with such conditions, the nose cone of a modern missile may be designed so that the heat generated during its reentry into the atmosphere is dissipated through ablation of material from the exterior wall of the nose cone. To preserve the structural integrity of the nose cone, it is necessary that the material ablate uniformly and at a low enough rate that the wall section remains intact. The present instrument is particularly well adapted for use in testing such materials and may also be used in actual flight vehicles to determine ablation under reentry conditions.

Briefly, the novel sensor comprises a body made from the same material as that being investigated. Within the body are embedded wires forming a plurality of electrical switches. The switches may be of two types, normally opened and normally closed. Further, the switches may be arranged in two groups, the switches within each group being positioned at intervals along the length of the body.

The body is normally inserted in the material to be tested and is oriented so that it ablates with the material. As ablation occurs, successive switches are exposed and associated circuits are either opened or closed by the breaking or making of the switches. In this way, the degree of ablation can be detected at a remote point. For example, the sensor may be used in connection with a telemetry system for relaying information from a flight vehicle to ground observers.

In view of the foregoing it will be understood that an important object of the present invention is to provide an improved instrument, and more particularly an improved device for measuring ablation of materials.

A more specific object is to provide an ablation sensor having a plurality of switches whose electrical condition is changed as ablation occurs.

Still more specifically, it is an object of the invention to provide an ablation sensor comprising an elongated body within which is embedded a plurality of electrical switches for detecting ablation.

Other objects of the invention are:

(a) To provide an ablation sensor having a body which is longitudinally split and grooved to receive wires forming a plurality of switches;
(b) To provide groups of electrically opened and electrically closed switches in opposed relationship sharing a common conductor;
(c) To provide in an ablation sensor a plurality of switches spaced at predetermined intervals longitudinally of a sensor;
(d) To provide electrical circuits which may be used in combination with the sensor for producing potential variations that are indicative of the degree of ablation of the sensor.

The novel features that are considered characteristic of the invention itself, however, both as to its organization and method of operation, together with additional objects and advantages thereof, will best be understood from the following description of specific embodiments when read in conjunction with the following drawings, in which:

FIGURE 1 is a fragmentary elevational view of the body of the sensor and its associated switches;

FIGURE 2 is a cross sectional view of the body on plane 2—2 of FIGURE 1 drawn to an enlarged scale;

FIGURE 3 is an exploded view of components which are assembled to the body of the sensor for supporting circuit elements;

FIGURE 4 is an enlarged view of a top mounting board, and its associated electrical connections, which constitutes a component of the sensor;

FIGURE 5 is an enlarged elevational view of the lower portion of the sensor;

FIGURE 6 is an enlarged view of a bottom mounting board which constitutes a component of the sensor;

FIGURE 7 is a fragmentary view of resistors supported by the upper and lower mounting boards;

Figure 8:
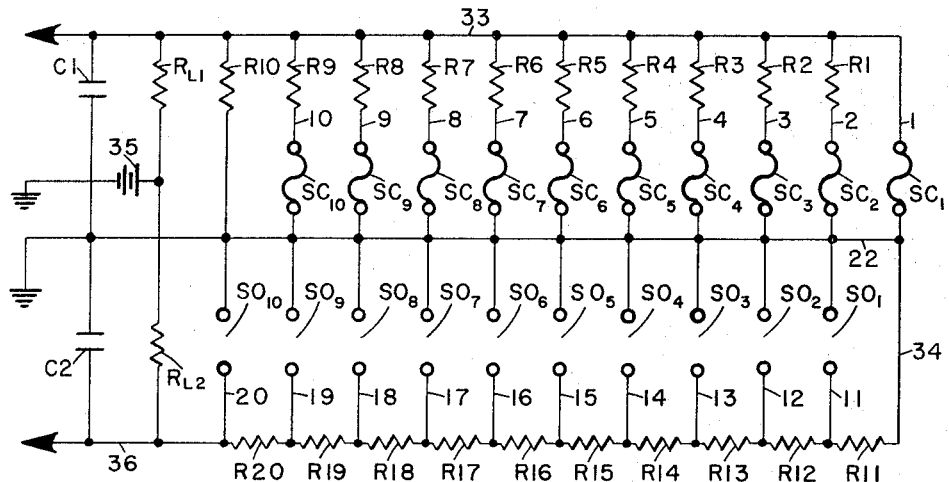
FIGURE 8 is a diagram of a circuit designed for use in the sensor.

Attention is first invited to FIGURE 1 which shows a cylindrical body B which is split longitudinally to define symmetrical halves C and D. The upper portion of half C has been broken away to reveal the interior construction of the body.

As shown in FIGURE 2, half D of the body defines a plurality of grooves G within which are positioned a plurality of wires 1–20. The grooves may be formed in half D by means of an ultrasonic machine, the pattern of the grooves being arranged to accommodate the wires in the pattern now to be described.

Each wire 1 through 10 constitutes one leg of a hairpin shaped loop of wire, all of the second legs of the hairpin lying within a common groove 21 and forming a common ground 22 as will be described hereinafter. Wires 11 through 20, on the other hand, are shaped like one half of a hairpin and terminate near the common ground 22 as shown in FIGURE 1. Concentrating on that figure, it will be noted that two groups of switches are shown. The first group is designated $SC_1$–$SC_{10}$, while the other group of switches is designated $SO_1$–$SO_{10}$. As suggested by the letter designations, the SC switches are normally closed switches, whereas the SO switches are normally open. As will be noted from the figure, the switches are spaced longitudinally within the body of the sensor at progressively larger intervals from its end 23.

In use, the end 23 is subjected to ablation conditions, such as extreme temperatures of several thousand degrees Fahrenheit. As the material of the body ablates away, i.e., melts and vaporizes, the groups of switches are successively exposed. The degree of ablation may be indicated by successive opening of the normally closed switches and successive closing of those that are normally open. Opening of the closed switches results from destruction of the wires as the outer portions of the body are destroyed through ablation. Closing of the switches occurs as electrically conductive plasma of the surrounding environment, or electrically conductive material of the sensor itself, bridges the gap between the exposed wires 11 through 20 and the common ground 22.

Provision of both normally open and normally closed switches assures satisfactory ablation measurement even though violent changes occur in the surface conductivity of the ablating material during test conditions. At low conductivity, the normally closed switches may be relied upon whereas at high conductivity, the normally open switches may be relied upon.

The body B is normally made of the same material as that being investigated. In this way, the ablation characteristics of the sensor and material are matched and their rate of destruction is maintained substantially identical. As a specific example, if a hot pressed silica material is under investigation, the body of the sensor should also be made of hot pressed silica. Since the silica, at elevated temperatures, is not electrically conductive, ablation will not close the switches $SO_1$–$SO_{10}$. It will be the successive opening of the normally closed switches that will provide a measure of ablation. On the other hand, some materials, such as metal reinforced materials and those having organic plastics as binders, yield electrically conductive substances as ablation occurs, and the degree of ablation is indicated by the successive closing of the switches $SO_1$–$SO_{10}$. Furthermore, in the case of flight vehicles, the extremely hot plasma flowing over the ablating surface is highly conductive and ablation may be indicated by successive switch closing.

Not only is the body of the sensor matched to the material under test but the wires employed within the body are selected with regard to the melting temperature characteristics of the material. To illustrate, when the sensor is made from silica, annealed molybdenum wires are employed in making the switches since molybdenum and silica have closely similar melting temperatures. As a result, during ablation, the wires neither protrude from the ablating surface nor melt at a level below the surface. Instead, the wires melt and disintegrate at the surface providing a true indication of the degree of ablation.

Longitudinal spacing may be chosen with regard to the type of test to be performed. The switches need not be uniformly spaced but may be spaced at selected intervals so that output signals from the opening and closing switches may be obtained as specific degrees of ablation occur.

If the halves of the body are closely fitted along their parting planes, they need not be cemented together but may be clamped together mechanically. This is illustrated by FIGURE 3 which shows a cylindircal clamp 24, having an adjusting screw 25, which may be slid over the upper portion of the body until it comes into snug engagement with flange 26 of the body. When thus positioned, adjusting screw 25 may be tightened and the clamp will hold the halves of the body securely together.

A lower collar 27 is also provided for engagement with the body below flange 26.

Piloted on the clamp 24 and the collar 27 are upper and lower mounting boards 28 and 29. After the clamp and collar are assembled to the body, the mounting boards may be properly aligned with each other and the body cemented to the clamp and collar while being temporarily held in place by screws 30. In the preferred embodiment, parts 24, 27, 28 and 29 are made from phenolic resin which may be readily cemented to each other by the use of epoxy resin.

Between the mounting boards are attached the various electrical components of the sensor circuit that will be described shortly. It is sufficient to understand at the moment that the mounting boards are fastened near the lower end of the body and are housed within a protective box 31 having a cover plate 32 to which the screws are secured during final assembly.

At this point, attention is directed to FIGURE 8 which discloses the electrical circuit of the sensor. The normally opened and normally closed switches $SO_1$–$SO_{10}$ and $SC_1$–$SC_{10}$ are designated by conventional notation. It will be noted that switches $SC_2$–$SC_{10}$ are each connected in series with a resistor $R_1$–$R_9$. Wires 2–10 extend between the related switches and resistors. The opposite ends of all of the resistors are connected to a common conductor 33 which delivers the voltage signal from the SC switches to an associated circuit (not shown) such as a telemetry circuit.

Each of the SO switches is connected by wires 11–20 to points between series resistors $R_{11}$–$R_{20}$. To illustrate, wire 11 is electrically connected to the common terminal between resistors $R_{11}$ and $R_{12}$. The opposite end of resistor $R_{11}$ is connected by conductor 34 to the common ground 22.

The voltage source for the circuit is a battery 35 which is connected through resistors $R_{L1}$ and $R_{L2}$ to conductors 33 and 36, respectively. The conductor 36 is connected to resistor $R_{20}$ and with wire 20. This conductor may be connected to an associated circuit (not shown) such as a telemetry circuit.

It will be noted that a resistor $R_{10}$ is connected between common lead 33 and the common ground 22.

To minimize noise in the output circuits associated with switch opening and closing, condensers $C_1$ and $C_2$ are connected between the conductors 33 and 36 and the common ground 22, as illustrated in FIGURE 8.

The physical arrangement of the various resistors and condensers can easily be understood by a study of FIGURES 4–6.

In FIGURE 4 is shown the mounting board 28 on which is electroplated a plurality of terminals that will be specifically mentioned. Similarly, in FIGURE 6 is shown the lower mounting board 29 having a plurality of electroplated terminals and conductors.

It will be convenient to concentrate at first on the mounting of resistors $R_1$–$R_{10}$ between the mounting boards. It will be noted that these extend between the common conductors 33 (which takes the form of an electrodeposited strip of metal on board 28) and a plurality of circular electrodeposited terminals $t$, called "bull's-eyes" on the lower mounting board. At these terminals, electrical connection is made between wires 2–10 and the associated wires of the resistors $R_1$–$R_9$. This is clearly indicated in FIGURE 6. The wires from the body of the sensor are shown encased in protective insulation 37.

The group of return wires from the normally closed switches which, in combination constitute the common ground 22, are shown connected to terminal I on the housing of the sensor. These wires are also encased in a protective sheath 38.

It will be noted that wire 1 from switch $SC_1$ does not connect to a resistor but passes directly between mounting boards where it makes connection at 39 with the upper conductor 33.

The location of resistors $R_{10}$, $R_{L1}$ and condenser $C_1$ can also readily be found in these figures. Resistor $R_{10}$ extends between the conductor 33 (see FIGURE 4) to a ground bus 40 which is plated on board 29 (see FIGURE 6). It will be noted that conductor 41 interconnects the ground bus with terminal I. In the case of resistor $R_{L1}$, it is secured between the mounting boards and connected by conductors 42 and 43 to conductor 33 and a battery bus 44 (see FIGURE 6). Condenser $C_1$ is also connected to the conductor 33 (see FIGURE 4), and to an extension of the ground bus 40 (see FIGURE 6).

The circuitry associated with the normally opened switches can be traced with equal facility.

First referring to FIGURE 6, it will be noted that wires 11–20 extend from the body of the sensor to a plurality of elongated terminal strips $u$ which are electroplated on board 29. A cooperating plurality of terminal strips $v$ are plated on the upper board 28. Between these terminal strips extend the resistors $R_{11}$–$R_{20}$. For purposes of illustration attention may be directed to resistors $R_{11}$ and $R_{12}$ which are representative. $R_{11}$ extends between the ground bus 40 at its lower end and terminal $x$ at its upper end. The wire $w$ associated with the resistor is bent through 180°, passing completely through terminal $x$ a second time and then passing downwardly between the mounting boards until it makes connection at point $y$ of terminal $z$ on the bottom mounting board. It will be noted, however, that the lower end of resistor $R_{12}$ is also connected to terminal $z$ as is wire 11.

Thus, the circuit components are connected as shown in FIGURE 8 with wire 11 being connected in common with the ends of resistors $R_{11}$ and $R_{12}$.

To aid in understanding the physical connection of resistors $R_{11}$–$R_{20}$, FIGURE 7 has been included showing the wires from the resistors first passing through the upper mounting board and then passing between the mounting boards to make connection with the lower terminal. Understanding the construction of the sensor is simplified when it is recognized that the upper and lower terminals $u$ and $v$ are arranged at an angle to one another. Because of this relationship, the wires extending from the upper ends of the resistors to the lower mounting board automatically make series connection with the next successive resistor.

For structural convenience, a special electroplated strip 45 is provided on the upper mounting board to make connection from the upper end of resistor $R_{16}$ to the upper end of resistor $R_{17}$. Wire 16 from the body of the sensor is also connected to strip 45 through the return wire from the top of resistor $R_{17}$. The lower end of resistor $R_{18}$ is in turn connected to the lower end of resistor $R_{17}$ and also to wire 17 at the lower mounting board. Wire 20 passes directly between the mounting boards and makes connection with strip 46 which is connected by conductor 47 to terminal III of the sensor.

To simplify an understanding of the series connection of the resistors, the wires returning from the upper ends of the resistors to the lower mounting board have been shown in dash lines in FIGURE 6.

Resistor $R_{L2}$ is connected at its upper end to strip 46 and at its lower end by conductor 48 to the battery bus 44. Condenser $C_2$ is connected between an extension of the strip 46 and an extension of the ground bus 40.

Summarizing the terminals of the sensor, they are as follows:

Terminal I: Ground connection (connected to common ground 22 and ground bus 40).

Terminal II: Output terminal from normally closed switches (connected to common conductor 33).

Terminal III: Output terminal from normally opened switches (connected to strip 46, which is the equivalent of conductor 36 in the circuit diagram).

Terminal IV: Battery terminal (connected to battery bus 44 by conductor 49).

The compactness and rigidity of the sensor are noteworthy. The resistors are all closely clustered about the center line of the sensor, minimizing bending moments and inertial loading. All connections are easily accessible and can readily be made with ordinary soldering tools. (When molybdenum wire is used in the sensor, mechanical crimping of the wires with those of the resistors is advised in addition to soldering.)

It will also be noted that the sensor has only four external terminals which can easily be connected to telemetry or other recording equipment. The sensor can be handled and installed as an entity without any confusion of wires or possibility of damage to internal connections within box 31.

Figure 9:
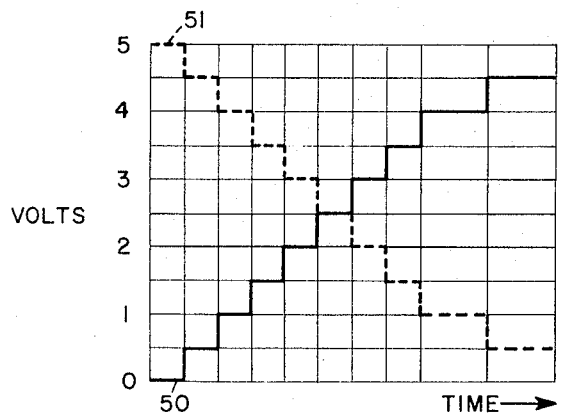
FIGURE 9 is a graphical representation of voltage signals derived from the sensor during ablation.

Component parameters of an actual sensor are tabulated below. These should not be taken as limitations of the invention but merely as indicative of actual values that have been found practical. Assuming a 6 volt DC battery, the following resistance and capacitance values may be used:

$R_1 = 20$ ohms
$R_2 = 60$ ohms
$R_3 = 120$ ohms
$R_4 = 200$ ohms
$R_5 = 300$ ohms
$R_6 = 420$ ohms
$R_7 = 560$ ohms
$R_8 = 720$ ohms
$R_9 = 900$ ohms
$R_{10} = 483$ ohms
$R_{11} = 6932$ ohms
$R_{12} = 3916$ ohms
$R_{13} = 2514$ ohms
$R_{14} = 1755$ ohms
$R_{15} = 1292$ ohms
$R_{16} = 992$ ohms
$R_{17} = 786$ ohms
$R_{18} = 642$ ohms
$R_{19} = 528$ ohms
$R_{20} = 444$ ohms
$R_{L1} = 126$ ohms
$R_{L2} = 5140$ ohms
$C_1 = 10$ microfarads, 6 volts
$C_2 = 10$ microfarads, 6 volts Prior to ablation Terminal II and Terminal III are at zero and 5 volts, respectively. As switch $SC_1$ opens, the potential of Terminal II rises to ½-volt, whereas upon closing of switch $SO_1$, the potential of Terminal III drops to 4.5 volts. The graph of FIGURE 9 shows stepped curves 50 and 51 showing the voltage changes at Terminals II and III, respectively, as the switches successively change state as ablation occurs. The time between the successive output signals depends upon the rate of ablation and the axial spacing between the successive levels of switches in the sensor. In view of the fact that the spacing between the switches is known, the rate of ablation of the surface under investigation can readily be established.

It has been found in practice that the switches of the sensor open and close, as the case may be, cleanly and with very little noise. Using output signals in ½ volt steps, it is possible to establish the degree of ablation and rate of ablation with exactness and a high degree of reliability.

An advantage of the series resistor, open switch circuit may now be noted. As successive switches close, a current path of decreasing resistance is established between the battery and ground. Other current paths of higher resistance through the wires of previously opened switches are immaterial and do not constitute a source of noise. In other words, as the switches are successively closed and then ablated away, their wires remain and a conductive medium in contact with them can erratically make and break the circuit between them. Such an occurrence is immaterial, however, because current can and does more readily flow through the next successive switch to be closed since it resides in a path of lower resistance. In short, the circuit arrangement has the advantage of producing very little noise and may be used in testing materials that are conductive at high temperature.

In view of the foregoing description of the invention it will be recognized that it lends itself admirably to high temperature investigation of materials and to use in flight vehicles such as nose cones.

The various features and advantages of the invention are thought to be clear from the foregoing description. Others not specifically enumerated will undoubtedly occur to those versed in the art, as will variations of the preferred embodiment illustrated, all of which may be achieved without departing from the spirit and scope of the invention as described by the following claims:

What is claimed is:

1. In combination in a ablation sensor, an elongated body, adapted to ablate longitudinally, a plurality of longitudinally spaced open switches laterally displaced from said plurality of closed switches, one each of said open and closed switches being positioned in the same longitudinal plane of said body, means for developing output signals, as said switches are sequentially opened and closed by ablation of said body.

2. A combination as described in claim 1 in which said plurality of closed and open switches are formed by wires embedded in said elongated body.

3. The combination as defined in claim 2 in which said open switches having wire in common with at least one of said closed switches.

4. In combination in an ablation sensor, a longitudinally split elongated body having mating faces, at least one of the mating faces being grooved, wires positioned within the grooves to form two groups of electrical switches, one group comprising a plurality of longitudinally spaced closed switches, and the other group defining a plurality of longitudinally spaced open switches, clamping means for holding the split portions of said body together, mounting boards supported by said clamping means, and a plurality of circuit components supported by said mounting boards in electrical connection with said wires for developing output signals as the switches defined by said wires successively change electrical state as the body progressively ablates along its length.

5. Apparatus as defined in claim 4 in which said circuit components comprise resistors, a first and a second output conductor, certain of said resistors being connected to said first output conductor and in series with the closed switches, other resistors being connected between the open switches and in series with said second output conductor, a common ground conductor connected to the open and closed switches remote from their connections to said resistors, and a source of electrical potential connected to establish current flow through said output conductors and resistors and said switches to said ground conductor when the switches are conditioned to permit current flow.

6. Apparatus as defined in claim 5 and, in addition, load resistors connected between said potential and said output conductors.

7. In combination in an ablation sensor, a longitudinally split cylindrical body defining mating diametral surfaces, one of the surfaces being grooved, a plurality of wires positioned within the grooves, said wires defining a group of normally closed and a group of normally opened switches, said wires defining the normally closed switches having hairpin shapes of graduated size nested within each other while lying in the grooves, one leg of each hairpin shaped wire being joined to form a common conductor, the wires comprising the normally opened switches being of graduated size and shaped to cooperate with the common conductor of the normally closed switches in defining the open switches, means for holding said body and wires in assembly, and a plurality of circuit components mounted on said body in electrical connection with said wires for developing output signals as the switches defined by said wires are sequentially opened and closed by ablation of said body.

References Cited
UNITED STATES PATENTS

| | | | |
|---|---|---|---|
| 414,155 | 10/1889 | Head | 200—142 |
| 501,653 | 7/1893 | Havard | 200—142 |
| 2,477,458 | 7/1949 | Johnson | 102—28 |
| 2,551,225 | 5/1951 | Spierer | 340—244 |
| 2,787,783 | 4/1957 | Storm | 340—244 |
| 2,851,557 | 9/1958 | Hansson et al. | 200—113.3 X |
| 2,866,875 | 12/1958 | Swain et al. | 200—120 X |
| 2,867,793 | 1/1959 | Bland et al. | 340—227 |

DAVID SCHONBERG, *Primary Examiner.*

B. A. BORCHELT, C. A. CUTTING, A. M. HORTON,
*Examiners.*

P. G. BETHERS, W. ROCH, *Assistant Examiners.*

UNITED STATES PATENT OFFICE
CERTIFICATE OF CORRECTION

Patent No. 3,367,175                 February 6, 1968

John A. Morreal et al.

It is certified that error appears in the above identified patent and that said Letters Patent are hereby corrected as shown below:

Column 3, line 46, after "body" insert -- and --; line 71, "$H_{20}$" should read -- $R_{20}$ --. Column 6, line 61, after "spaced" insert -- closed switches and a plurality of longitudinally spaced --.

Signed and sealed this 23rd day of September 1969.

(SEAL)
Attest:

Edward M. Fletcher, Jr.                 WILLIAM E. SCHUYLER, JR.
Attesting Officer                         Commissioner of Patents